United States Patent
Cheiky et al.

(10) Patent No.: US 6,641,949 B2
(45) Date of Patent: Nov. 4, 2003

(54) BATTERY VENT AND METHOD OF ASSEMBLY

(75) Inventors: Michael Cheiky, Santa Barbara, CA (US); Glen Robles, Santa Maria, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 138 days.

(21) Appl. No.: 09/839,318

(22) Filed: Apr. 19, 2001

(65) Prior Publication Data

US 2002/0155343 A1 Oct. 24, 2002

(51) Int. Cl.[7] .............................. H01M 2/12; H01M 2/02
(52) U.S. Cl. ............................ 429/53; 429/82; 429/163; 29/623.2
(58) Field of Search ........................ 29/623.1–623.5; 429/53–56, 71, 72, 82, 127, 163

(56) References Cited

U.S. PATENT DOCUMENTS

| 4,020,241 A | 4/1977 | Heinz, Jr. | |
|---|---|---|---|
| 4,052,533 A | 10/1977 | Heinz, Jr. | |
| 4,064,323 A | 12/1977 | Messing | |
| 4,092,464 A * | 5/1978 | Dey et al. | 429/127 |
| 4,180,624 A | 12/1979 | Winsel | |
| 4,659,636 A * | 4/1987 | Suzuki et al. | 429/54 |
| 4,822,377 A | 4/1989 | Wolff | |
| 4,916,034 A * | 4/1990 | Hulsebus et al. | 429/86 |
| 4,965,144 A | 10/1990 | Ng et al. | |
| 5,422,200 A * | 6/1995 | Hope et al. | 429/157 |
| 5,554,455 A | 9/1996 | Inoue et al. | |
| 5,569,551 A * | 10/1996 | Pedicini et al. | 429/27 |
| 5,603,656 A * | 2/1997 | Baer et al. | 454/339 |
| 5,702,840 A | 12/1997 | Byon | |
| 5,741,606 A | 4/1998 | Mayer et al. | |
| 5,789,096 A | 8/1998 | Kilb | |
| 5,916,704 A * | 6/1999 | Lewin et al. | 429/54 |
| 6,060,191 A * | 5/2000 | Iwatare | 429/53 |
| 6,346,341 B1 * | 2/2002 | Witzigreuter | 429/27 |

FOREIGN PATENT DOCUMENTS

GB 2087636 A * 5/1982

* cited by examiner

Primary Examiner—Susy Tsang-Foster
(74) Attorney, Agent, or Firm—Marvin E. Jacobs

(57) ABSTRACT

A battery that generates a gas during charge or discharge contains a two-stage vent system including a rigid case permeable to the gas such as ethyl celluose which is permeable to hydrogen gas disposed in an expandable envelope impermeable to the gas such as metallized plastic film. The gas permeates the walls of the case and expands the envelope. The gas is vented from the envelope through a porous plug such as microporous polyethylene sealed into the film.

5 Claims, 2 Drawing Sheets

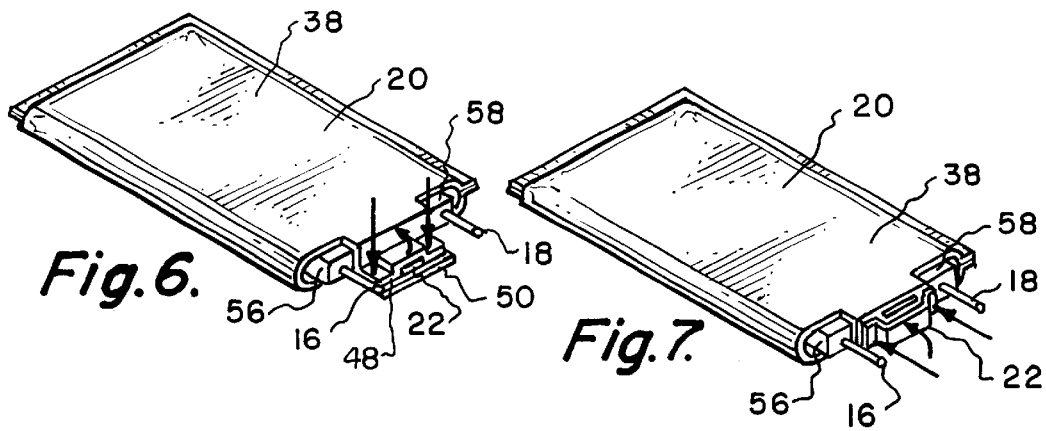
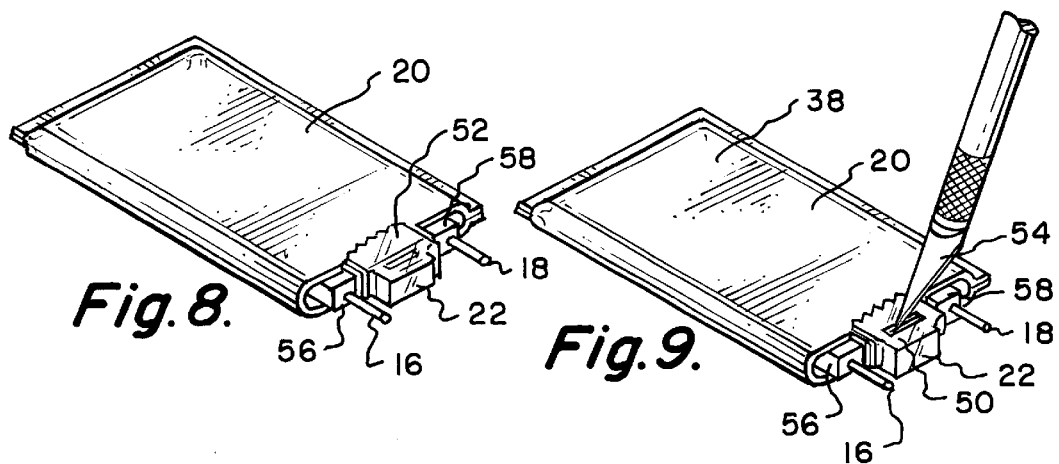
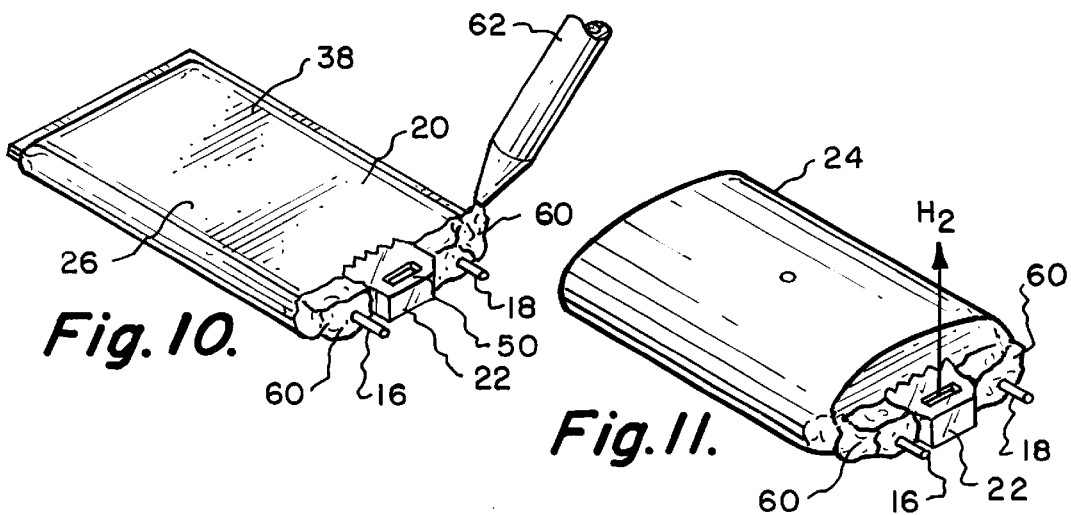

BATTERY VENT AND METHOD OF ASSEMBLY

TECHNICAL FIELD

The present invention relates to a vent for a rechargeable battery and, more particularly this invention relates to a vent for a zinc alkaline battery.

BACKGROUND OF THE INVENTION

Electrolytic reactions, especially those reactions occurring in aqueous electrolyte can produce gas during charging, discharging or over charging operations. Many batteries are cathode or anode limited to prevent generation of gas. Uncontrolled generation of gas can disrupt a cell compartment and/or lead to catastrophic destruction of the cell with attendant hazard of injuring personnel with a spray of debris and of acid or basic electrolyte.

Gas buildup in certain electrolytic reactions is somewhat unavoidable such as in alkaline batteries due to corrosive influence of the alkaline electrolyte on charged active metal species in the anode according to the following reaction:

$$M+H_2O \rightarrow MOH+1/2H_2$$

Where "M" represents a metal species such as zinc, cadmium, iron, nickel and the like.

A particularly severe problem arises when a seemingly small gas buildup leads to increased battery impedance, which in turn, depending on the charging scheme used, can lead to further gas production. Thus, a positive feedback loop is established.

STATEMENT OF PRIOR ART

Vents have been utilized to provide controlled release of gas generated within a battery case. Ideally, a battery should not vent, for material lost through a vent represents loss of reactant and departure from the optimum conditions originally designed for the battery. Since gas formation in a rechargeable alkaline battery, particularly at the end of the charging cycle, is to some extent unavoidable, it is necessary that a venting mechanism be provided.

Deformable elements in batteries have been utilized to exhaust gas upon build-up from a battery. Kilb in U.S. Pat. No. 5,789,096 describes a valve with a deformable element comprising a thermoplastic elastomer such as a modified polyamide, a styrene-ethylenebutylenestyrene copolymer, and/or polypropylene. This valve is designed to open during increased pressure and to close under normal pressure. U.S. Pat. No. 4,020,241 by Heinz, Jr. shows a resilient elastomeric sponge gasket disposed between the battery cell and the container of the cell along the cover-gasket interface that vents in the 5 to 75 psi region.

Valves have also been prominently utilized to gradually vent gas from batteries. In U.S. Pat. No. 5,554,455 Inoue et al. describe a valve which projects from a hole in the battery, comprising a moving element and a coil spring. An electrical valve is described in U.S. Pat. No. 5,741,606 by Mayer et al. Internal pressure within the battery opens up an electrical contact which places the battery in open circuit. A backup pressure relief system consists of a pressure rupturable region in the flap portion of the system. Wolff in U.S. Pat. No. 4,822,377 depicts a compressible deformable vent plug operable in the range of 200 to 500 psi. Winsel in U.S. Pat. No. 4,180,624 describes two valves in the battery housing, one which responds to an overpressure and the other one to underpressure. Heinz, Jr. in U.S. Pat. No. 4,052,533 discloses a cup-shaped flapper vent valve that deflects upwardly with pressure.

Holes in battery cases are also used as vent elements. U.S. Pat. No. 5,702,840 describes two holes in a depressed region of a lithium battery, said region being filled with electrolyte. Ng et al. in U.S. Pat. No. 4,965,144 describe a hole which transmits pressure to an O-ring. In the event of excess pressure within the container, the O-ring is displaced by the excess pressure to vent the container and the O-ring returns to its original sealing position when the excess pressure is relieved. Messing in U.S. Pat. No. 4,064,323 teaches the use of a metal foil which is sandwiched between two gas pervious plastic layers. The metal foil fractures in the case of buildup which allows gas transmission.

STATEMENT OF THE INVENTION

In the present invention, the case is not modified. Rather, the present invention utilizes a multistage venting system. First, the case is made of a particularly high gas transport material. A one-way valve, in the form of a metallized plastic envelope tightly wrapped around the battery, expands upon pressure accumulation. Gas is released through a porous plug attached to the metallized plastic. In the event of a serious catastrophic gas buildup, the case cracks and spills its contents into the metallized plastic bag, and gas is still released through the plug.

The battery vent system according to the invention, is formed of the following components: 1) A battery case made of a rigid material such as an injection moldable resin having good permeability to gas, suitably ethyl cellulose or polypropylene in the case of hydrogen gas. The case has walls capable of rupture under fast buildup of gas pressure. 2) The battery case is tightly enveloped by an expandable, gas impermeable enclosure such as a metallized plastic film. The film envelope contains a vent permeable to the generated gas such as a plug made of porous resinous material. The metallized plastic film envelope expands in the envelope as pressure buildup outside the case and the gas exhausts through the plug. Once exhausted, the film envelope returns to its original shape.

The two-stage venting system increases shelf-life and operational life of the battery by safely releasing gas buildup in the battery case. The venting system is easily manufactured from readily available materials. The components of the system are mechanically simple, comprising a molded case, metallized film and a plug of porous plastic. The system is simple to fabricate involving steps of molding, folding and sealing. The venting system is found to be extremely reliable and cost effective.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 6 is an isometric view showing folding and sealing of central flaps around the plug;

FIG. 7 is an isometric view showing folding the plug into vertical position;

FIG. 8 is an isometric view showing presence of a length of tape to hold the plug in vertical position;

FIG. 9 is an isometric view showing slitting of the tape over the plug to provide a vent;

FIG. 10 is an isometric view showing potting and sealing the electrodes to the envelope; and FIG. 11 is an isometric view showing expansion of the envelope and venting $H_2$ gas through the plug.

DETAILED DESCRIPTION OF THE INVENTION

Figure 1:
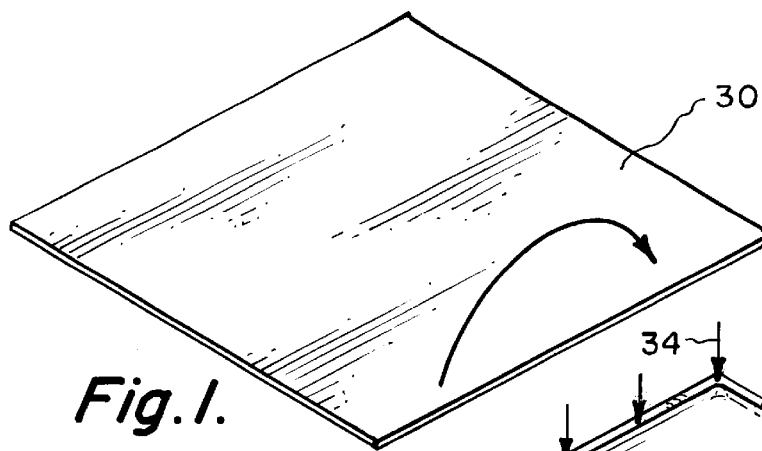
FIG. 1 is an isometric view of the a sheet of metallized plastic.
Figure 2:
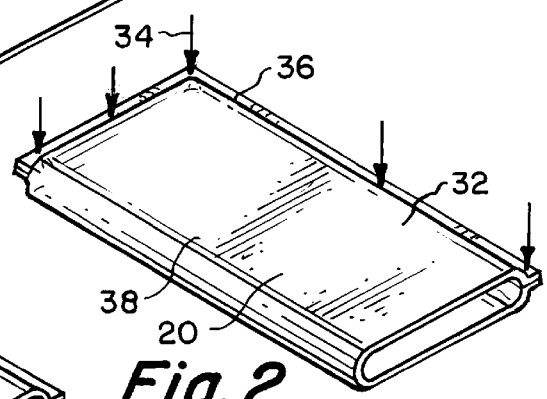
FIG. 2 is an isometric view of a tubular envelope formed from the sheet of FIG. 1.
Figure 3:
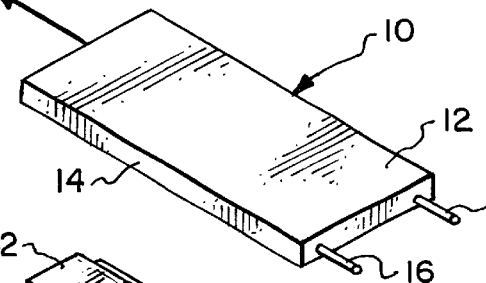
FIG. 3 is an isometric exploded view showing insertion of a battery into the envelope of FIG. 2.
Figure 4:
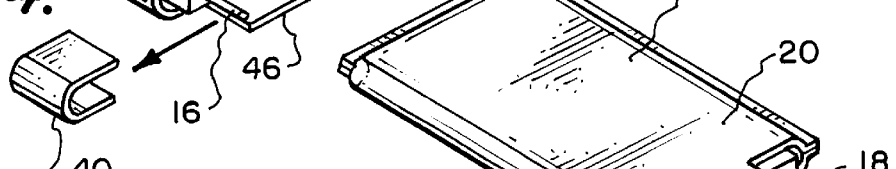
FIG. 4 is an isometric view of the of the assembly of the envelope and battery of FIG. 3 showing removal of side portions to expose battery terminals.
Figure 5:
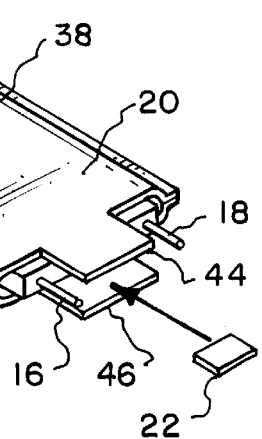
FIG. 5 is an isometric exploded view showing a plug in relation to the opening of the envelope.

The venting system as shown in FIGS. 1–11 comprises a battery 10 having a rigid case 12 having walls 14 formed of a material that is permeable to a gas generated during operation of the battery 10. Electrode terminals 16, 18 sealingly penetrate the case 12 and are connected to anode and cathode current collectors, not shown. The battery contains a layer of cathode paste, a layer of anode paste and a plurality of electrolyte laden separators between the layers, all not shown. The case 12 is sealed into an envelope 20 formed of a film impermeable to the gas generated by the battery 10. The terminals 16, 18 penetrate the envelope 20 and are sealed to the envelope. A plug 22 of material permeable to the gas is sealed into the envelope 20 such that as the gas is generated and passes through, the walls 14 of the case 12, the envelope 20 will first expand as shown 24 in FIG. 11. As the generated gas releases through the plug 22, the envelope will deflate and return to the condition 26 shown in FIG. 10.

Referring again to FIGS. 1–11 the vent system is assembled by folding a sheet 30 of flexible, metallized plastic film, preferably aluminized polyethylene or nylon and heat sealing the folded film 32 along the bottom edges 34 and side edges 36 to form an open envelope 38. The battery 10 is then placed in the envelope 38 and the corners 40, 42 are cut to expose the battery terminals 16, 18. The porous plug 22 is inserted between the envelope flaps 44, 46. The flaps 44, 46 are heat sealed together to form a single flap 48 having the edge 50 of the plug exposed. The single flap 48 can be folded and secured against the envelope 20 by a strip 52 of tape. The tape is slit by a knife blade 54 over the edge 50 to form a vent outlet.

The open corners 56, 58 of the envelope are then sealed with potting compound 60 dispersed from an applicator 62 to form a sealed envelope 20.

A zinc alkaline battery was assembled into a sealed, rigid ethyl cellulose case. The battery included a stack of silver plated anode screen, zinc paste, cellulose separators, silver cathode paste and silver plated cathode screen as disclosed in copending application Ser. No. 09/839,270 filed concurrently herewith entitled SILVER-ZINC ALKALINE RECHARGEABLE BATTERY (STACKING ORDER) the disclosure of which is expressly incorporated herein by reference. The battery base was sealed into an envelope formed of metallized film whose outer layers comprise a plastic such as a polyethylene, polypropylene vinyl, a linear polyamine such as nylon or polyester such as mylar. A porous plug of polyethylene or polypropylene foam was sealed into the envelope.

The battery terminals, extending through apertures in the film and case, are potted with a thermoplastic insulator such as low melting polyethylene to insulate the terminals from the metallized film and to form a hydrogen impermeable seal of the apertures.

It is to be realized that only preferred embodiments of the invention have been described and that numerous substitutions, modifications and alterations are permissible without departing from the spirit and scope of the invention as defined in the following claims.

What is claimed is:

1. A battery vent system comprising in combination:
    at least one zinc alkaline electrolytic cell that generates hydrogen during charge or discharge of the cell;
    a rigid battery case encasing said cell, said case having walls permeable to hydrogen, said walls comprised of a plastic material selected from the group consisting of ethyl cellulose and polypropylene;
    an expandable sealed envelope formed of a metallized plastic film which is impermeable to hydrogen receiving said case;
    and a plug on said envelope formed of microporous polyethylene or polypropylene which is permeable to hydrogen.

2. A system according to the claim 1 in which the case is formed of ethyl cellulose.

3. A system according to claim 2 in which the film is aluminized polyethylene or nylon.

4. A method of venting hydrogen gas from a zinc alkaline electric storage battery comprising the steps of:
    encasing at least one cell of the battery capable of generating said hydrogen gas in a rigid case having walls permeable to said hydrogen gas, said walls comprised of a plastic material selected from the group consisting of ethyl cellulose and polypropylene;
    enveloping the case in an expandable envelope of metallized plastic film which is impermeable to said hydrogen gas;
    generating said hydrogen gas during charge and discharge of said cell which permeates said walls and collects in and expands said envelope; and
    venting said hydrogen gas from said envelope through a plug in said film, said plug comprised of a plastic material which is permeable to said hydrogen gas selected from the group consisting of microporous polyethylene or polypropylene.

5. A method according to claim 4 in which the walls comprise ethyl cellulose.

\* \* \* \* \*